United States Patent [19]
Davies

[11] 3,984,059
[45] Oct. 5, 1976

[54] LIQUID HANDLING

[76] Inventor: Robert Henry Davies, Anfield, Mill Lane, Herne Bay, Kent, England

[22] Filed: Mar. 12, 1974

[21] Appl. No.: 450,380

[30] Foreign Application Priority Data
Mar. 13, 1973 United Kingdom............... 12001/73

[52] U.S. Cl.............................. 141/387; 138/114; 285/47; 285/133 R; 285/DIG. 5
[51] Int. Cl.² .......................................... B65B 3/04
[58] Field of Search ............ 138/114; 141/279, 387, 141/388; 308/3 R; 285/DIG. 5, 47, 133 R, 134; 62/55

[56] References Cited
UNITED STATES PATENTS

| | | | |
|---|---|---|---|
| 2,650,112 | 8/1953 | Kinkead............................ | 285/47 |
| 3,039,275 | 6/1962 | Lacaze et al.................. | 285/DIG. 5 |
| 3,068,026 | 12/1962 | McKamey..................... | 285/DIG. 5 |
| 3,329,472 | 7/1967 | Donnellan et al.................... | 308/3 R |
| 3,372,715 | 3/1968 | Ashton............................... | 141/387 |
| 3,674,086 | 7/1972 | Foster..................................... | 62/55 |
| 3,706,208 | 12/1972 | Kadi et al. ..................... | 285/DIG. 5 |
| 3,775,989 | 12/1973 | Mursinna et al...................... | 62/55 |
| 3,777,502 | 12/1973 | Michie et al............................ | 62/55 |
| 3,823,569 | 7/1974 | Sellmaier et al......................... | 62/55 |
| 3,843,171 | 10/1974 | Hewlett et al. ................ | 285/DIG. 5 |
| 3,845,639 | 5/1974 | Smith et al.............................. | 62/55 |

Primary Examiner—Houston S. Bell, Jr.
Attorney, Agent, or Firm—Cushman, Darby & Cushman

[57] ABSTRACT

In the context of the handling of cryogenic materials, particularly liquefied natural gas (LNG), in marine loading systems, coaxial ducting links various plant sites of the system to provide in the one link both liquid transfer ducting and a return ducting for vapor of the liquid. Return of this vapor in the outer ducting helps thermally insulate the liquid in the inner ducting from the surrounding. The ducting is made up of rigid coaxial pipes swivellably connected together by swivel joints having no rolling bearing parts.

Two particular arrangements of system are shown in one of which satellite loading buoys are linked to a main storage tank; in the other a main storage tank is fed with liquefied gas from a well head tower and has tanker-loading equipment itself. Loading equipment for a tanker may be comprised in the circuit which includes the coaxial ducting.

6 Claims, 10 Drawing Figures

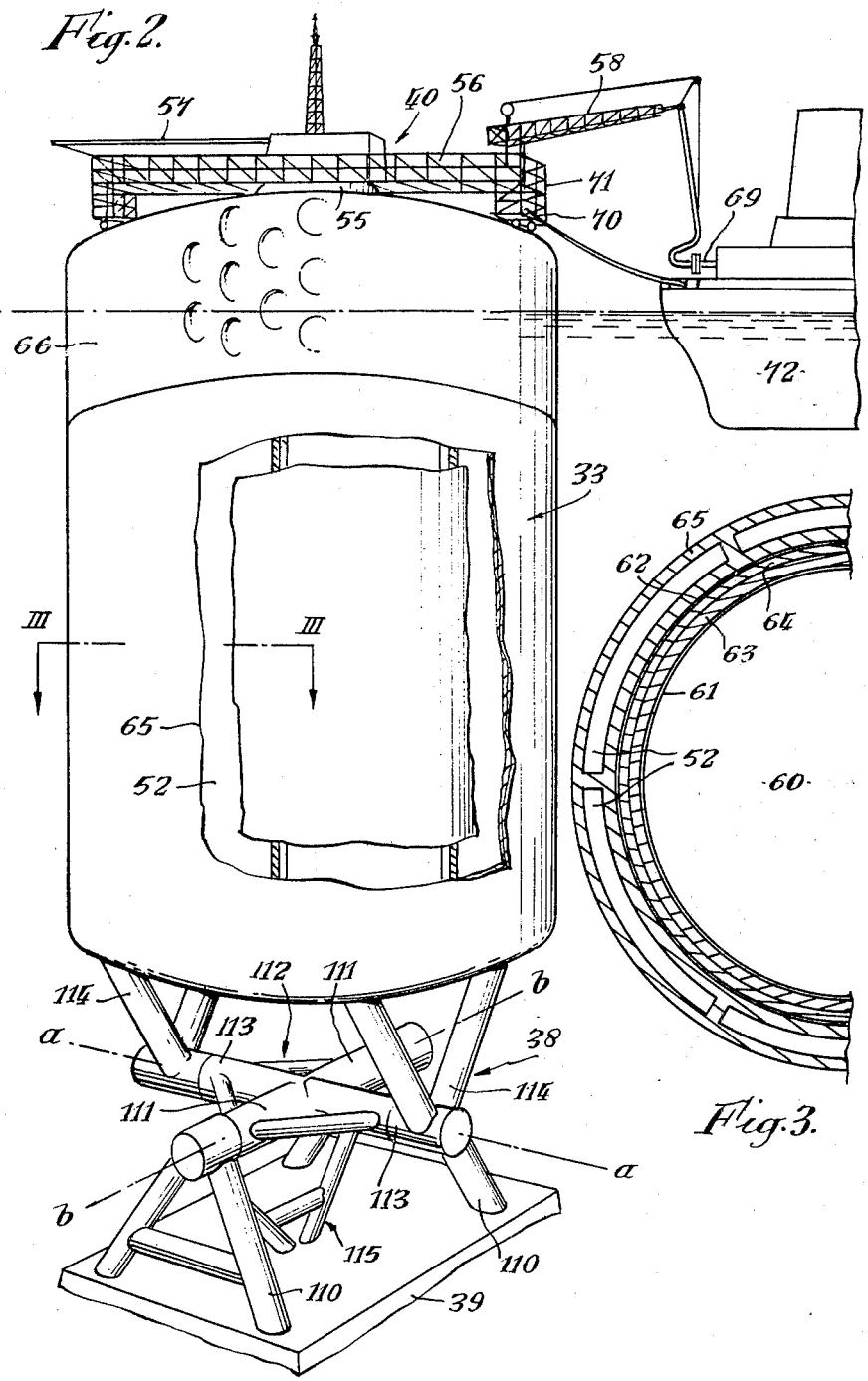
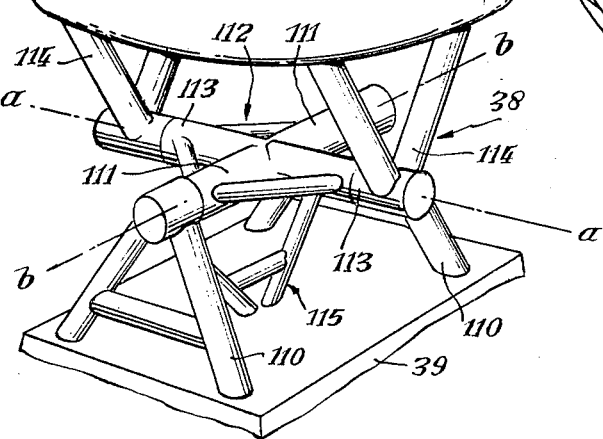

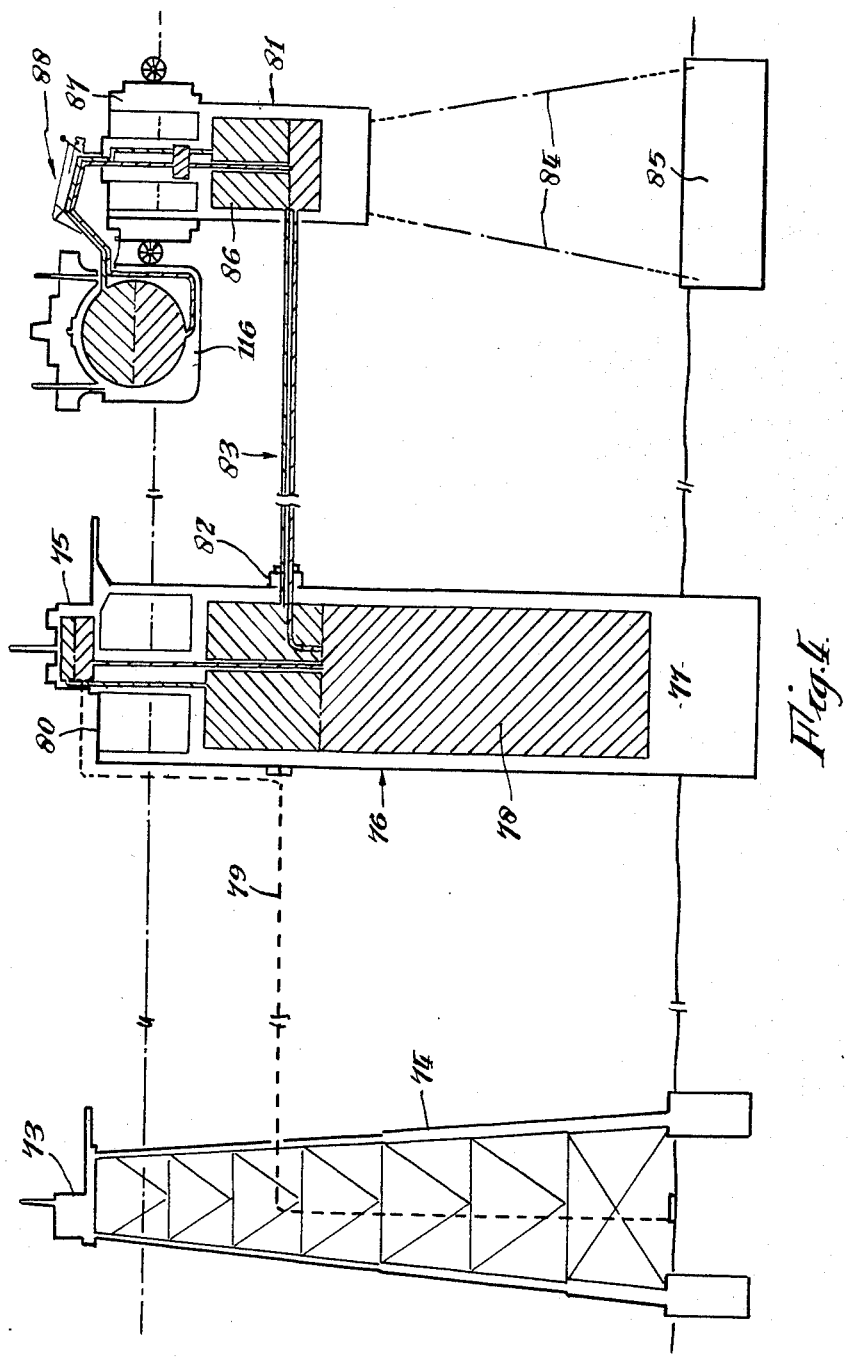

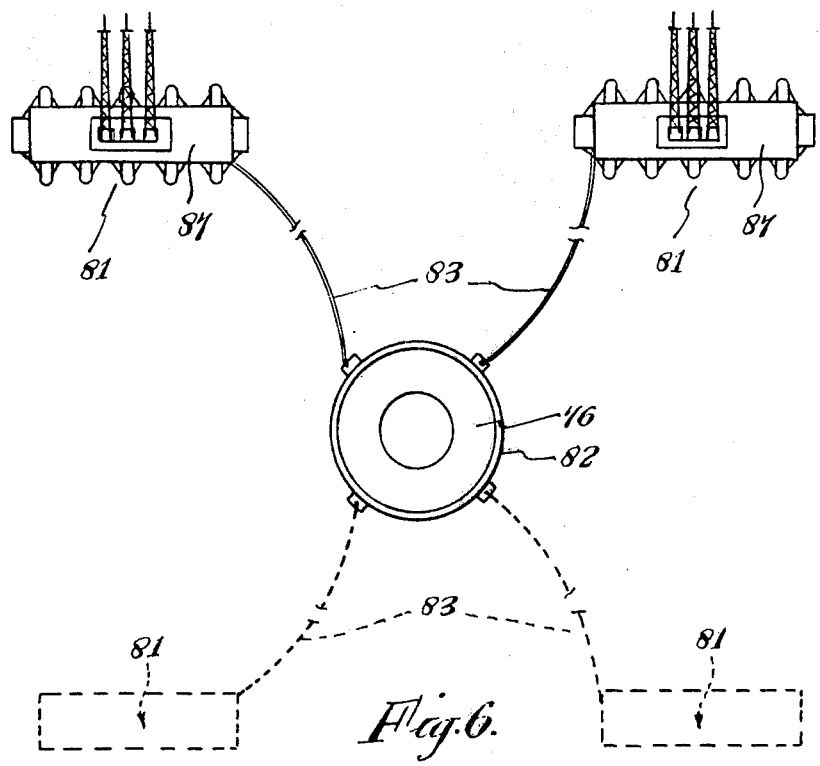
Fig. 6.
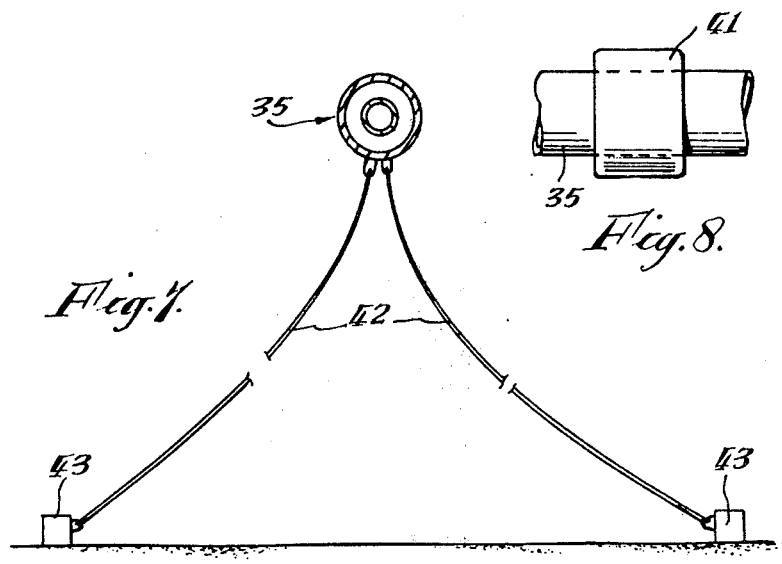
Fig. 7.
Fig. 8.

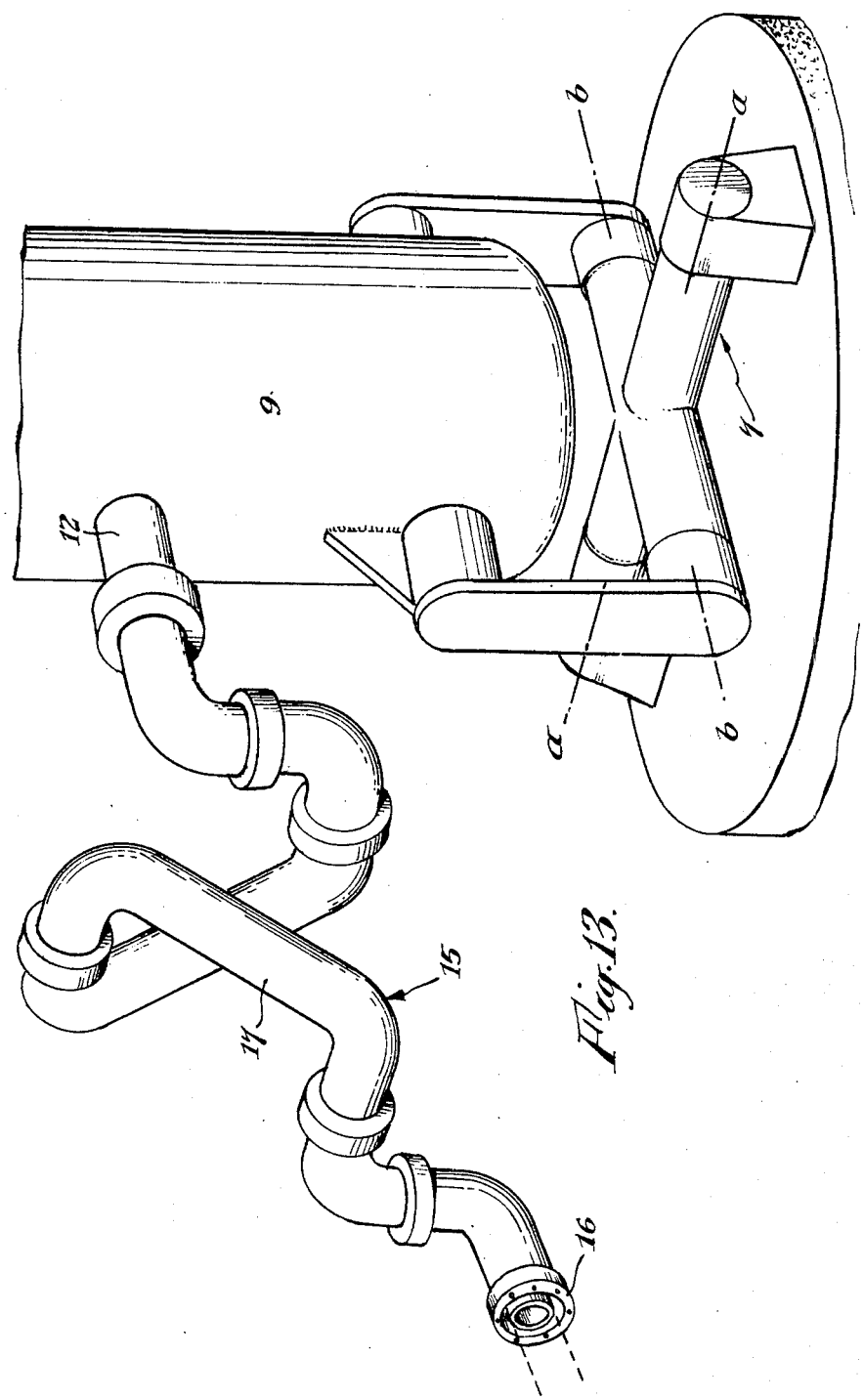

LIQUID HANDLING

FIELD OF THE INVENTION

This invention relates to marine loading systems handling cryogenic materials, particularly liquefied natural gas (LNG).

BACKGROUND OF THE INVENTION

These materials being of high volatility and being liquid only at low temperatures and/or high pressures present special problems in handling.

In particular, although need for pressure equalization has been realized as between various areas of the systems, recycling of vapour arising from the liquid cryogenic material has previously been done through ducting quite separate from that which conducts liquid between the various areas of the systems, using separate return pumps. This is wasteful in terms of constructional material needed, in terms of compactness and in terms of inefficiency in the necessary prevention of heat absorption into the system.

SUMMARY OF THE INVENTION

The present invention removes these disadvantages by linking the various plants or sites of the system by coaxial ducting. It is made up of rigid coaxial pipes, to avoid the difficulties which use of flexible hose would present with these cryogenic materials. But flexibility overall is essential in a marine environment and this is achieved in the present invention by swivellably coupling together adjacent coaxial pipes at least some of which are of non-linear configuration. The design of successful such couplings involves difficulties in design of and nature of swivel bearing arrangements, having regard to the material being handled, but in preferred forms of the invention these are overcome by providing a coaxial swivel construction having inner and outer sealed swivel bearings devoid of rolling contact elements, the inner ducting being spaced within the wall of the outer by a spider arrangement.

The coaxial ducting thus made up is used with a pressure equalization vapour return path in the outer of the two coaxial ducts, the liquid transfer path being in the centre duct. Then, although lagging for thermal insulation will still usually be provided outside the outer ducting, the vapour aids prevention of heat absorption by the liquid by acting as a jacket around the internal ducting carrying the liquid.

The coaxial ducting may be used in any convenient position between stations of a marine loading system. It can for very deep water be submerged and maintained at constant depth by bouyancy and anchorage systems. The anchoring may be by flexible chains fixed to the sea-bed laterally of the pipeline so as to maintain a desired catenary of the chains for the positioning of the ducting. Alternatively this coaxial ducting can be located at the sea bed.

The ducting may link, for example, a liquefaction plant on a well-head tower to a main storage tank, or a main storage tank to one or more satellite mooring buoys having each a subsidiary storage tank and at least one loading arm.

The circuit thus set up including the coaxial ducting may extend to the storage vessels of a tanker moored to the main storage tank or to a satellite mooring buoy and linked to it by a loading arm having both a liquid transfer ducting and a vapour return ducting (these two may be coaxial at the loading arm as well as in the aforementioned ducting).

To allow for relative longitudinal movement between the inner and outer pipes the pipe lengths may include a sealing-tight sliding joint in the inner pipe.

In a first embodiment of marine loading system at a marine production site within the invention for the handling of liquefied natural gas, there is a combined storage tank and loading station anchored to the seabed, spaced from a liquefaction plant but connected thereto by the submerged coaxial ducting.

The combined storage tank and loading station are preferably anchored to the seabed in a way to allow pivotal movement at the anchorage in response to horizontal thrust at the loading station, and incorporate buoyancy means for stabilisation. Where the co-axial pipeline is laid at the seabed, the supply connection to the storage tank is made concentrically through the universal anchor joint on the same axis with a universal co-axial pipe connection.

The liquefaction plant may be combined with a production platform at the well head production site.

It a second embodiment of marine loading system at a marine production site within the invention for the handling of liquefied natural gas, the main storage tank is separate from and spaced from one or more loading stations, each loading station being a satellite buoy anchored to the seabed and connected to the storage tank by submerged coaxial ducting. Preferably the or each satellite buoy includes a subsidiary storage tank.

Preferably there is a plurality of satellite buoys, the storage tank having a circumferential ring manifold with a nozzle for the coaxial pipeline to each buoy.

The liquefaction plant may be mounted on the storage tank, which is rigidly anchored, and the combined storage tank and liquefaction plant may be spaced from the production well head site and connected thereto by a submerged gas transmission pipeline.

In a third embodiment of marine fluid handling system, for transferring volatile liquid between shore storage and tanker vessel, a loading station with vessel mooring point is anchored to the sea or river bed and includes a coaxial pipeline from the loading station to the shore.

The loading station may have a vapour chamber into which the outer pipe of the coaxial pipeline opens and which has a pipe or hose for connection to the tanker vessel for vapour transfer, the inner pipe of the coaxial pipeline extending through the vapour chamber to the liquid loading arm.

In another aspect the invention provides a method of transferring cryogenic liquid at a marine site to or from a storage tank and/or to or from a tanker vessel loading station, which includes transferring the liquid through an inner pipe of a submerged coaxial pipeline and allowing vapourised liquid to return through the outer pipe of the coaxial pipeline.

DESCRIPTION OF THE DRAWINGS

Particular embodiments of the invention will now be described by way of example with reference to the accompanying diagrammatic drawings, in which:

FIG. 2 is a more detailed elevational view of part of the system of FIG. 1;

FIG. 3 is a section on the line III—III, FIG. 2;

FIG. 4 is a view of a second embodiment of marine loading system showing an end view of a satellite buoy forming part of it;

FIG. 6 is a plan view of part of the embodiment of FIGS. 4 and 5;

FIG. 7 is a sectional view of the coaxial ducting normal to its axis;

FIG. 8 is an elevation of part of the coaxial ducting;

FIG. 13 is a perspective view of part of the third embodiment.

DESCRIPTION OF PREFERRED EMBODIMENTS OF THE INVENTION

Figure 1:
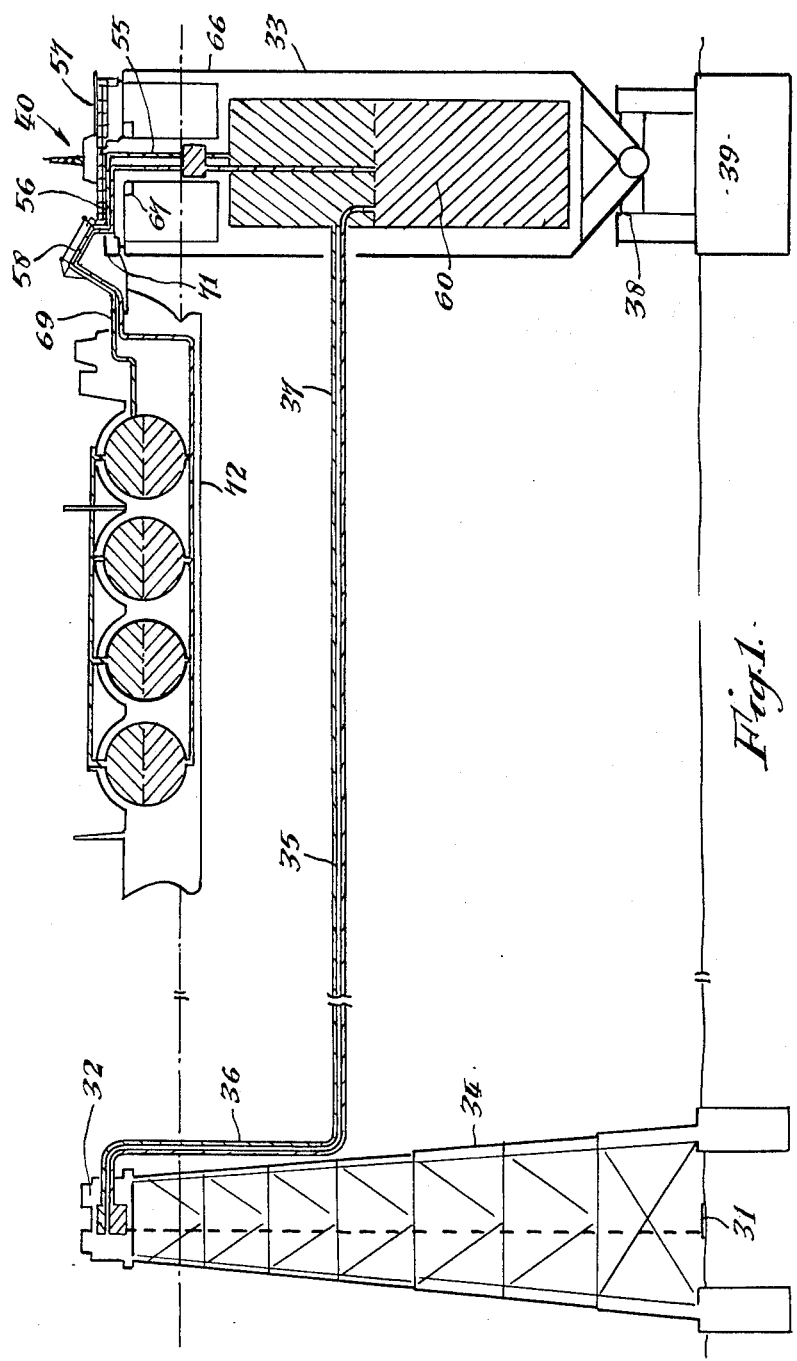
FIG. 1 is a first embodiment of marine loading system.

Referring to the first embodiment, shown in FIGS. 1 to 3, this illustrates one arrangement of a marine loading system for use with liquefied natural gas (LNG), which is a volatile cryogenic liquid. The gas is produced at a well lead and is liquefied before being stored in a main storage tank from which ocean-going tanker vessels are loaded to transport the liquefied natural gas to shore.

As shown in FIG. 1, production platforms including a liquefaction plant 32 are supported by a fixed frame structure 34 as a single unit at the site of the marine well-head 31. The lowest working platform is positioned above the maximum wave height for that site. The natural gas produced goes in gaseous form from the well head to the production platform, is purified and liquefied and then transferred by a submerged ducting 35 to a main storage tank 33 situated a mile or so away from the production site. This distancing allows tanker vessels to approach the tank 33 to take on the liquefied gas at a loading station 40 which is sited on top of the storage tank 33.

The ducting 35 is insulated coaxial pipes which allow a counter-current flow of liquid material in the inner ducting and returning vapourised material around it in the outer ducting. Exit from the liquefaction plant 32 is through a system of non-linear pipes 36 swivellably joined to each other so they can articulate to ensure that no excessive induced loads are transmitted to the liquefaction plant flange connection on movement of the ducting under the influence of wave or tide. Entry of the ducting 35 to the storage tank 33 is through the wall of the storage compartment of the tank and is positioned so as to minimise stratification and roll over of the liquefied gas in the tank. To keep induced forces within safe limits, a system of pipe swivels 37 like system 36 is again used. The ducting 35 is submerged to a distance below mean sea level to avoid the worst of wind and ware turbulence and to ensure that surface craft present no hazard. Details of the construction of the coaxial rigid pipes, their swivels, and of one conformation of articulating systems 36, 37 will be given later with reference to FIGS. 9. 10 and 13.

After this general description it can be seen that a system has been shown in which liquid can be conducted from liquefaction plant 32 to main storage tank 33 with return of vapourized gas from the upper part of the tank to the liquefaction plant, all through the single coaxial ducting 35. Liquid and vapour are shown differently in the drawing and their flow paths are shown separately, in this diagrammatic drawing, for clarity in illustrating the idea of counterflowing paths and a circuit through the system including the coaxial ducting.

The ducting 35 is maintained in a state of neutral buoyancy by a system illustrated in FIGS. 7 and 8. There is a plurality of buoyancy bags 41 fixed to the ducting at intervals and lateral stability is maintained by a plurality of anchor chains 42 anchored to the seabed at 43. The distance between the points 43 is determined by the height of the ducting above the sea bed and the chain catenary required to maintain horizontal movement within the required limits.

The main storage tank 33 is of a novel design and as mentioned above it incorporates a tanker loading station. The tank 33 is linked to a seabed anchor 39 by a pivotal bearing anchor system 38.

An opposed pair of trunnions 110 journal, in nonlubricated bearings, one pair of arms 111 of a cruciform intermediate member 112. The other pair of arms 113 of the member 112 are journalled by similar bearings in a pair of trunnions 114 depending from the base of the main storage tank 33. An inverted A-strut 115 gives lateral rigidity to the trunnions 110. Thus the storage tank 33 is pivoted about two mutually perpendicular axes a and b through the generally horizontally disposed cruciform intermediate member 112. This allows the vertically floating tank freedom of movement within controlled restraint, only upthrust being applied to the seabed anchor 39. The tank 33 incorporates a number of buoyancy chambers 52 around its peripheral inner wall which contain liquid ballast. Means are provided to vary the quantity of ballast so as to compensate for variation in the quantities of cryogenic liquid stored and so maintain a substantially constant upthrust on the anchor system 38.

At the upper end of the tank 33 there is an upstanding perforated wall 66 at sea-level to act as a breakwater around a central tower 55 (FIG. 2). The perforations in the wall 66 diffuse the sea-water and thus reduce the wave intensity. The tower 55 which contains the operating crew quarters bears the loading station 40. It has a rotatable working platform 56 mounted on it by means of a slewing ring 67. The platform 56 has a heli-pad 57 and carries marine navigational equipment, a landing stage 71 and coaxial marine loading arm 58. It has rollers running on the wall 66 for lateral and horizontal stability.

The coaxial marine loading arm 58 is mounted to the edge of the platform 56 diametrically opposite the heli-pad 57. A slewing arrangement on the vertical post of the arm allows the arm 58 to be rotated and stowed within the boundary of the platform 56 when not in use. Since the platform 56 is rotatable the arm 58 and mooring point 70 on landing stage 71, which depends from the platform below the arm 58, can be situated in any convenient position around the tank for loading a tanker 72 and indeed during mooring of the tanker as it moves around the storage tank. The landing stage includes a fender bay fully equipped to close-moor the tanker 72 at single point mooring 70. The arm 58 can then be connected to the tanker manifolds 69.

The storage tank 33 includes a liquid storage compartment 60 below sea level surrounded by buoyancy/ballast chambers 52. The tank wall has to be insulated for the handling of cryogenic liquid such as liquefied natural gas and its inner wall may consist of an internal stainless steel membrane 61 (see FIG. 3) and an outer carbon steel casing 62. Between these tow shells there is a spray-on insulation 63 and a thick foam insulation 64 which form a thermal barrier. The whole assembly is enclosed in a concrete hull 65 some 10 to 15 feet thick and in which the buoyancy and ballast chambers 52 are provided.

As already mentioned, the provision of the coaxial pipeline 35 described above allows vapour from the tank storage compartment 60 to return along the outer portion of the pipe to the liquefaction plant 32 where it is reliquefield. However vapour can similarly pass from the tanks of the tanker 72 during loading through the coaxial loading arm 58 into the tank storage compartment 60 and thence to the liquefaction plant 32. The vapour in the outer portion of the co-axial pipe also assists in the insulation of the cryogenic liquid flowing through the inner pipe.

Figure 5:
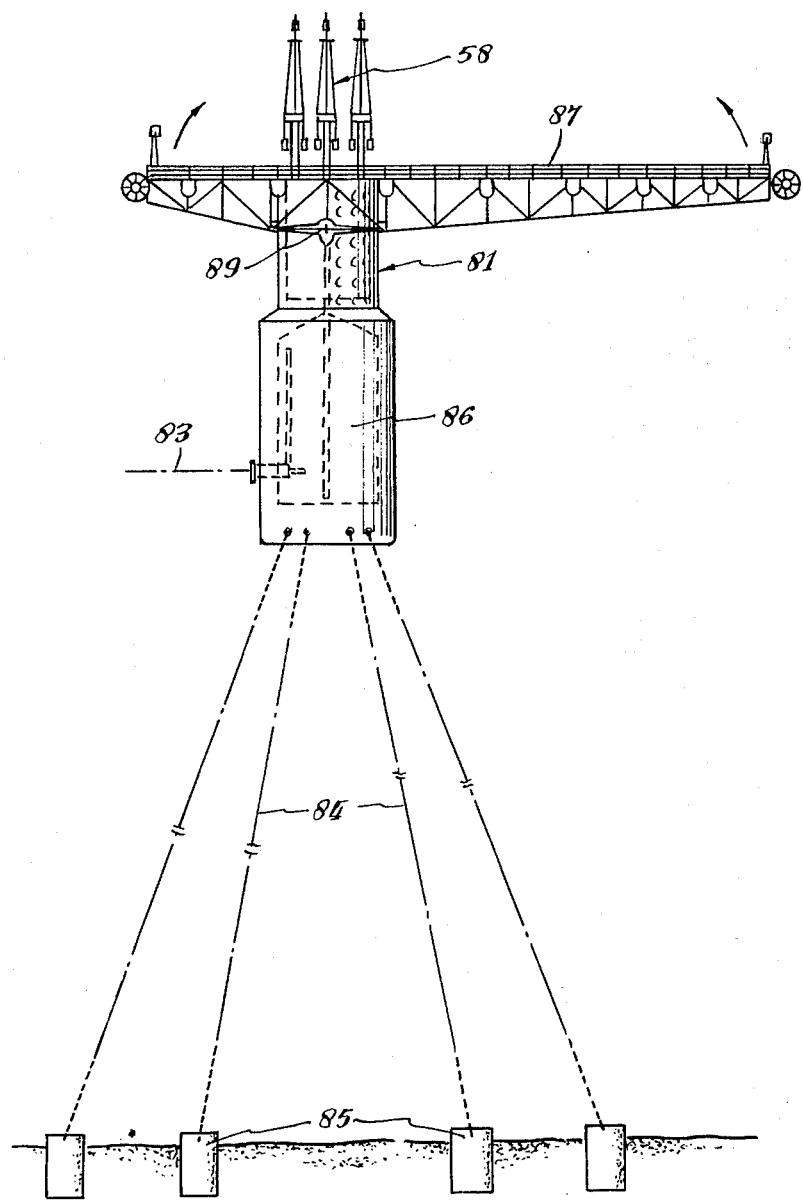
FIG. 5 is another view of the satellite buoy of the second embodiment.

The second embodiment of marine loading system illustrated in FIGS. 4 to 6 is also for the handling of liquefied natural gas which is produced at a well head, liquefied and stored for take-off by tanker vessels.

In this case a production platform 73 is mounted on the seabed at the well head site by a frame structure 74. Natural gas produced at the site is transferred through submerged pipeline 79 to a storage and liquefaction unit 76 consisting of a liquefaction plant 75 mounted on a submerged main storage tank 78. The unit 76 is anchored fixedly to a seabed foundation 77 at the base of the tank 78. A platform 80 is mounted on the top of the tank 78 to be above the maximum wave height at the site and this platform carries the liquefaction plant 75. Protection against severe wave conditions is provided by an upstanding perforated wall at the top of the tank 78 like the breakwater 66 described in the first embodiment. In an alternative, purification and liquefaction may be carried out on the well-head frame structure 74 as in the first embodiment.

Liquefied natural gas goes directly into the tank 78 for storage, the walls of the tank being of suitable insulated construction as, for example, in the first embodiment. The liquefied natural gas from the tank 78 is taken to one or more loading stations in the form of satellite loading buoys 81 for tanker loading, the stations 81 being at a distance from the unit 76 and arranged to allow adequate space for vessel manoeuvring. A scheme for positioning satellite loading stations 81 can be seen in FIG. 6. A circumferential ring manifold 82 surrounds the unit 76 with nozzles for connection to a plurality of submerged coaxial ductings 83, one to each satellite buoy 81.

Each loading station satellite buoy 81, as shown in FIG. 5, consists of a hull 86 containing buoyancy chambers and storage space. The hull 86 is anchored to a seabed foundation 85 by a system of chains 84 and carries a swivellable mooring platform 87 swivellable about a horizontal axis 89 as well as about a vertical axis and bearing one or more coaxial marine loading arms 88. This mooring platform 87 allows the tanker vessel 116 to rotate around the hull 86 during mooring. Each station 81 can operate independently of the others.

Thus liquefied natural gas is transferred from main storage tank 78 to one or more tanker vessel via the coaxial ducting 83, storage buoys 81 and coaxial marine loading arm. The liquid flows in the inner pipe of the coaxial piping, as described for the first embodiment, whilst the outer pipe acts as a return for vapourised gas from the storage space in the hull 86 of the buoys or from the tanker vessel. The vapour can be reliquefied at the unit 76. If necessary the coaxial pipes 83 can be anchored to the seabed by anchor chains as shown in FIG. 7 and kept buoyant by buoyancy bags as shown in FIG. 8.

Since the satellite stations 81 can move it is necessary for the ducting 83 to have a degree of freedom of movement and flexibility to take up the movement of the station 81, e.g. during mooring of a tanker vessel. For this purpose the ducting 83 have a number of swivel joints to be described later designed to give flexibility to the pipeline as a whole.

Figure 11:
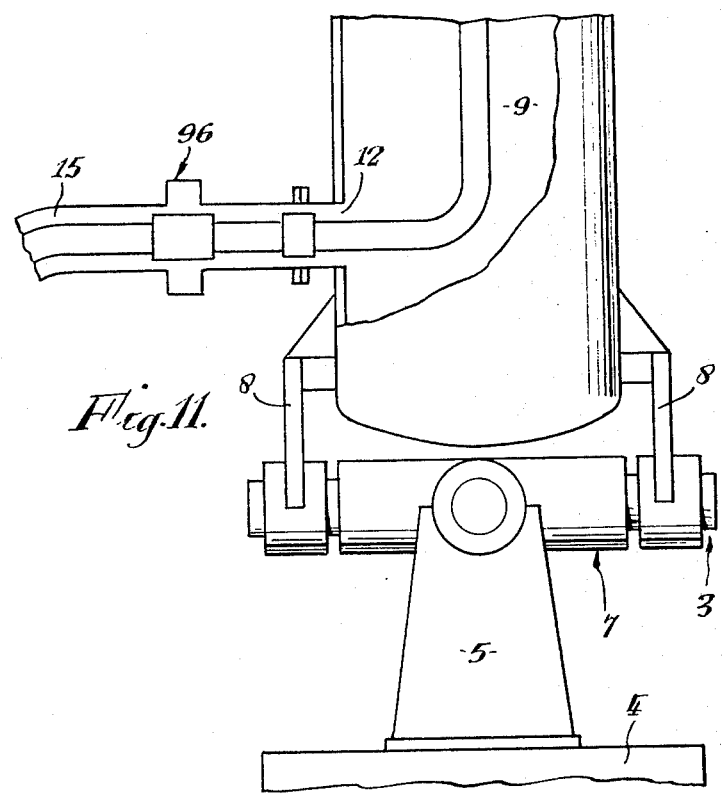
FIG. 11 is a diametrical section through part of a third embodiment.
Figure 12:
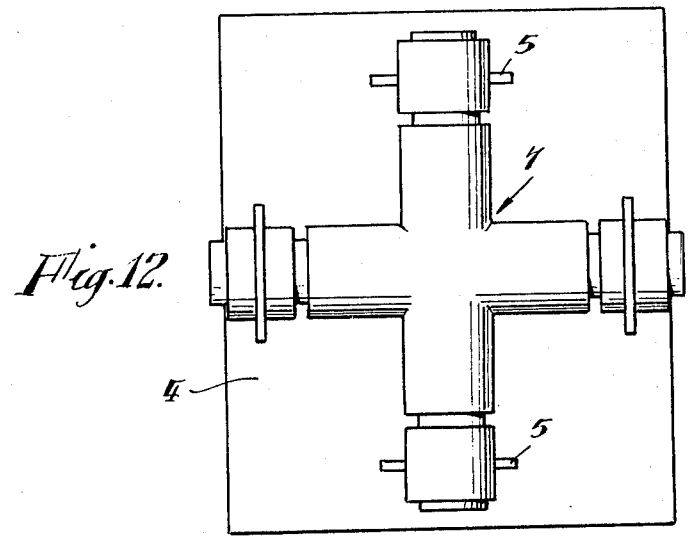
FIG. 12 is a plan view of part of the third embodiment.

A third embodiment of marine fluid handling system shown in FIGS. 11 to 13 is for transferring volatile liquid such as liquefied natural gas between a tanker vessel or barge and shore, e.g. to a shore-based main storage tank. This includes a tank-like vapour chamber 9 anchored to the sea or river bed offshore to be mostly submerged. The upper end of the vapour chamber carries the vessel mooring facilities and liquid leading arm. The chamber 9 is anchored to the seabed by an anchor 3 and includes a buoyancy tank. The anchor 3 is similar in principle to anchor 38 (FIG. 2). A base block 4 has a pair of trunnions 5 in which are journalled one pair of arms of a cruciform intermediate member 7: they are pivotable on the axis $a$. The other pair of arms of the member 7 are at right angles to the first pair and are journalled in legs 8 rigidly attached to the base of the chamber 9, so there can be relative rotation about the axis $b$, perpendicular to axis $a$. The vapour chamber 9 has a hose connection for the tanker vessel for vapour take-off (liquid will be loaded to or from the tanker by a loading arm) and is open at 12 near its base to the outer pipe of an insulated coaxial ducting 15 to shore. The inner and liquid-carrying pipe of the coaxial ducting passes through the vapour chamber 9 (which is in effect a coaxial pipe with an enlarged outer pipe) to the marine liquid loading arm for direct connection to the liquid storage tanks of a moored vessel. The ducting 15 is connected to 12 by a portion 17 which has swivel joints to give flexibility. This portion 17 shows an arrangement of swivel axes which gives free articulation between the tank 9 and the ducting 15. The ducting 15 itself includes non-linear pipe lengths joined to adjacent pipe lengths through swivels, to give the ducting flexibility as a whole. Portions 36, 37 (FIG. 1) may be arranged as portion 17; clearly other arrangements are possible which have the same effect.

Figure 9:
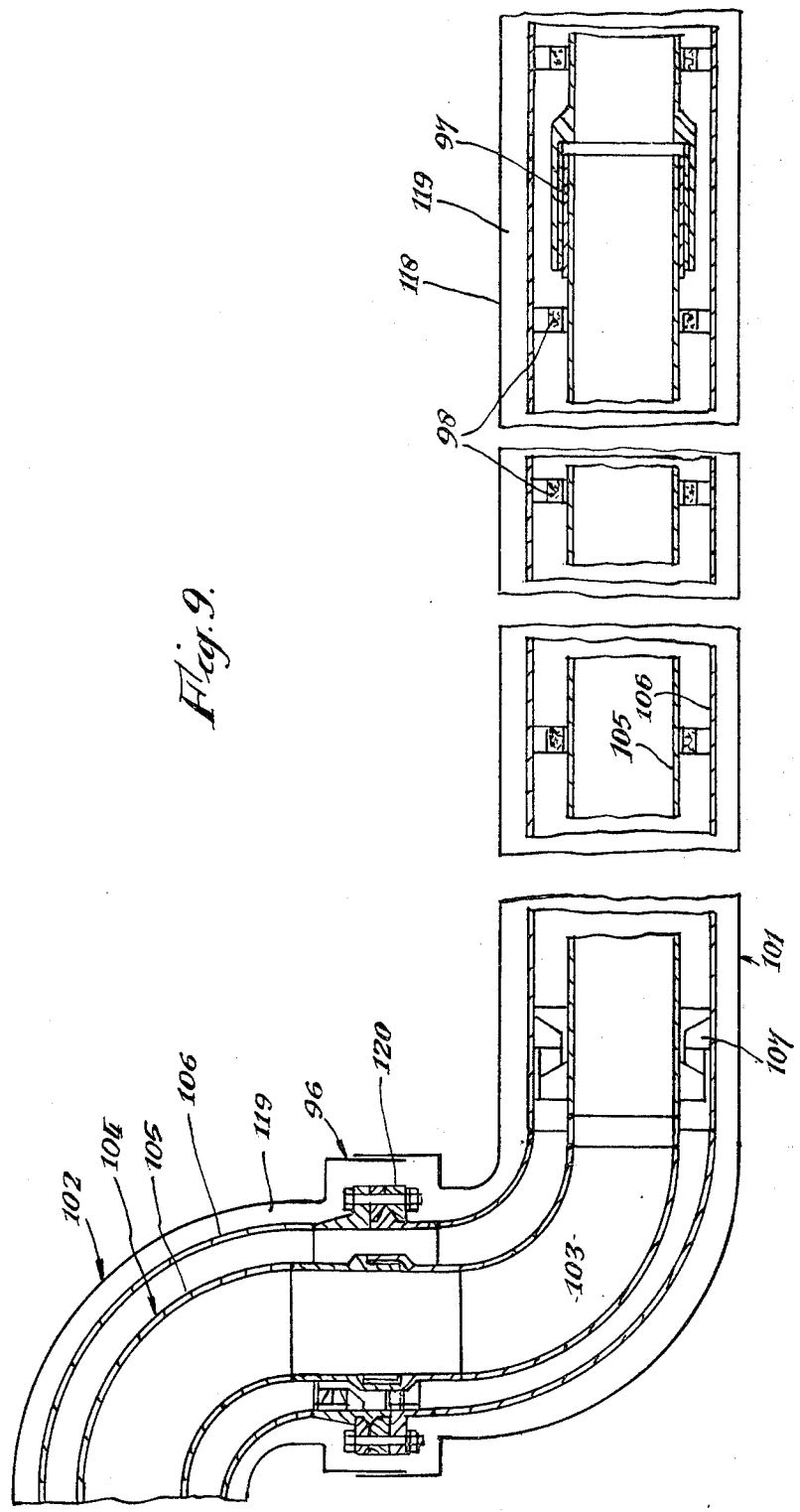
FIG. 9 is a diametrical section through a portion of one embodiment of coaxial piping.

A particular embodiment of coaxial piping which is suitable for use in transporting volatile liquids, particularly cryogenic liquids such as liquefied natural gas, will now be described with reference to FIGS. 9 and 10. This piping may make up the ducting 15, 35 or 83 in any of the above-described marine loading or transferring systems.

The pipeline is made up of a plurality of rigid coaxial pipes 101, 102 each of which has a right-angled bend 103, 104 near each end. The ends of adjacent pipes are joined at a swivel joint 96 to be described in more detail later. The swivel joint 96 allows the pipes to rotate relative to one another in a plane parallel to the length of the pipe, which may be a horizontal or vertical plane in use when the pipes are disposed horizontally, depending on whether the pipes are disposed so that the bends 103, 104 lead vertically or horizontally away from the main straight portion of the pipe. Thus in a length of pipeline these swivel joints allow a certain flexibility by allowing the pipeline to change its configuration in order to take up movement of the pipeline, the smaller the angle (in plan) between adjacent pipes, the greater the extension possible.

Each coaxial pipe has an inner pipe wall 105 defining ducting for liquid flow and an outer pipe wall 106 to define ducting for vapour flow in the intermediate annular space. The outer pipe 106 is unitary but the inner pipe 105 includes an axial contraction joint 97 (only one is shown) sealed by a labyrinth seal between the cylindrical sleeves which allows for relative longitudinal movement of the inner and outer pipes, due e.g. to contraction of the inner pipe when carrying cold liquid. The annular space between the inner and outer pipe walls is kept substantially constant by insulated spacers 98 situated at intervals, and also contains insulated anchor points 107 at each end of a pipe length which prevent relative axial movement of the inner and outer walls 105, 106 at those positions.

The outer pipe wall 106 is surrounded by a casing 118 which encloses an annular space filled with lagging 119, such as perlite. The casing 88 also includes a swivel at the plane of joints 96.

The spaces in pipes 106 and 105 have to be sealed from one another at all joints 96, 97 and during any movement at the joints.

Figure 10:
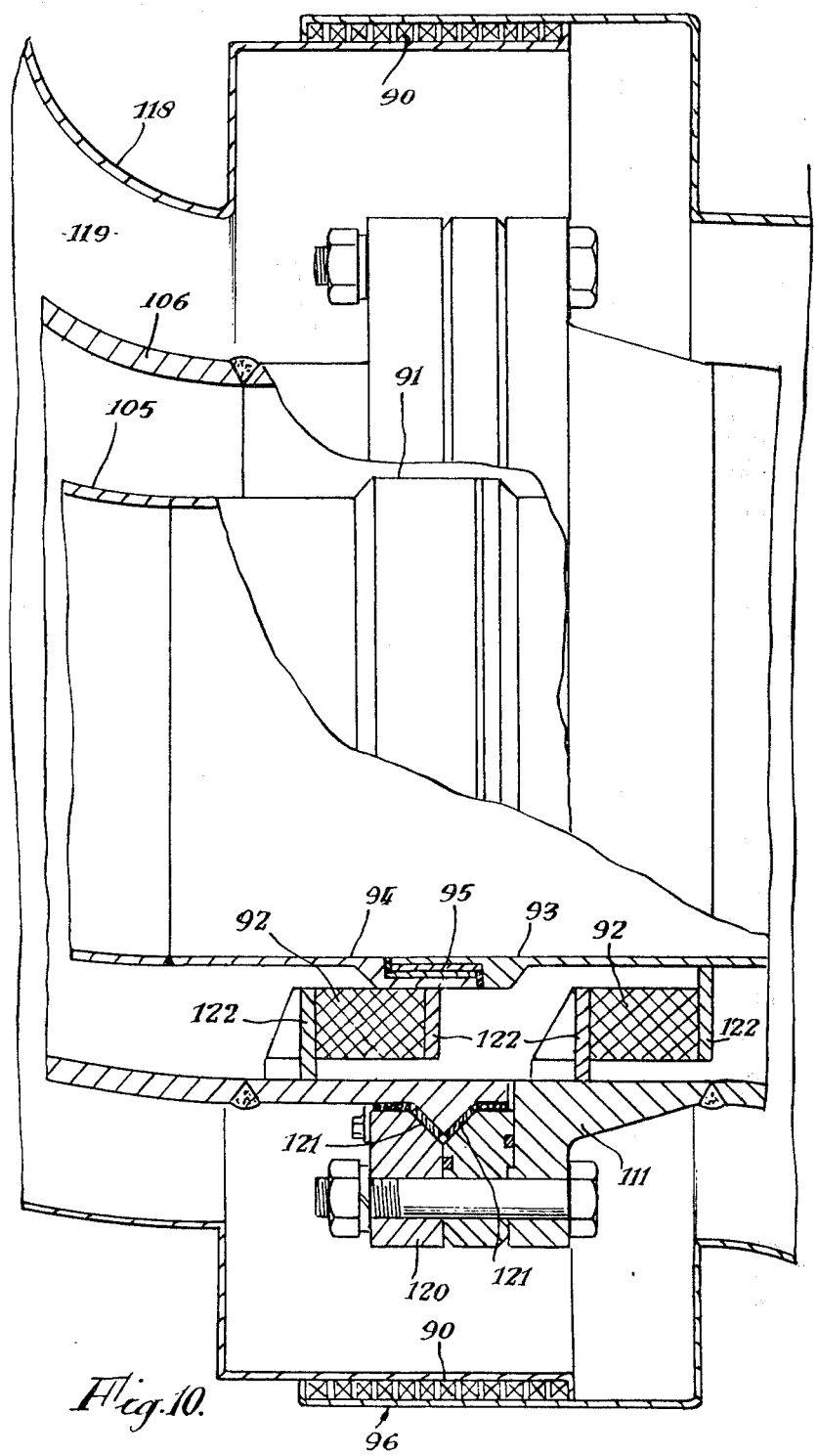
FIG. 10 is a detailed part-section of a joint of the piping of FIG. 9.

A swivel joint 96 is shown in greater detail in FIG. 10. The outer pipe walls 106 have a sealed swivel 120 with PTFE bearing 121 and the inner pipe walls 105 have a swivel 91 made of a spigot 93 and bell 94 accurately machined to form a recess for a seal packing and bearing 95. The ends of the pipes 105, 106 are mained at a constant spacing by support spiders including lugs or annular plates 122 spaced axially from each other and joined by axial spacer rods or plates 92. The casings are connected at the swivel joint 96 by a labyrinth seal 90 to allow relative rotation but prevent the ingress of sea-water into the insulation. The swivel construction is thus robust and devoid of any rolling bearing or lubricated bearing elements which present great difficulties in this use and this intended environment.

I claim:

1. A marine loading system for cyrogenic materials composing a plurality of material handling stations disposed at a corresponding plurality of marine sites respectively, and coaxial ducting between said stations comprising a plurality of rigid coaxial pipes, the pipes having inner and outer coaxial ducts extending in coaxial relationship substantially the whole length of the respective pipes, the inner duct for transfer of liquid material between the stations and the outer duct for pressure equalization return flow of vapour of said material, the outer duct providing a thermally insulating barrier for the inner duct, so that a closed circuit for flow of liquid and vapour of said material includes the handling stations and the coaxial ducting, and means for swivellably coupling said pipes together at swivels so that both the inner and outer ducts of a first pipe connected to a second pipe at a swivel may rotate relative to the inner and outer ducts respectively of said second pipe, the inner and outer ducts of both said first and second pipes remaining coaxial at said swivel.

2. A marine loading system as claimed in claim 1 wherein at least one of the rigid coaxial pipes has an outer duct wall which is unitary and an inner duct wall which is axially divided and includes an axial contraction and expansion joint.

3. A marine loading system as claimed in claim 1 wherein at least one of the rigid coaxial pipes has the inner ducts spaced from the wall defining the outer ducts by thermally insulating spacers, the said spacers at each axial end of the pipe being constructed to prevent relative axial movement of the inner and outer ducts at the said ends.

4. A marine loading system as claimed in claim 1 wherein bearings for relative rotation of the inner and outer ducts of the coaxial pipes at the swivels are non-rolling solid bearings.

5. A marine loading system according to claim 4 characterised in that at each axial side of the swivel bearings the inner ducts is spaced from and united to the outer ducts, by a spider construction including axially spaced projections on the ducts and axially extending stays connecting them.

6. A marine loading system according to claim 1 further comprising thermal insulation disposed around said outer ducts.

* * * * *